Oct. 1, 1957 H. W. PETTY 2,807,995
COOKING UTENSIL
Filed Jan. 20, 1955
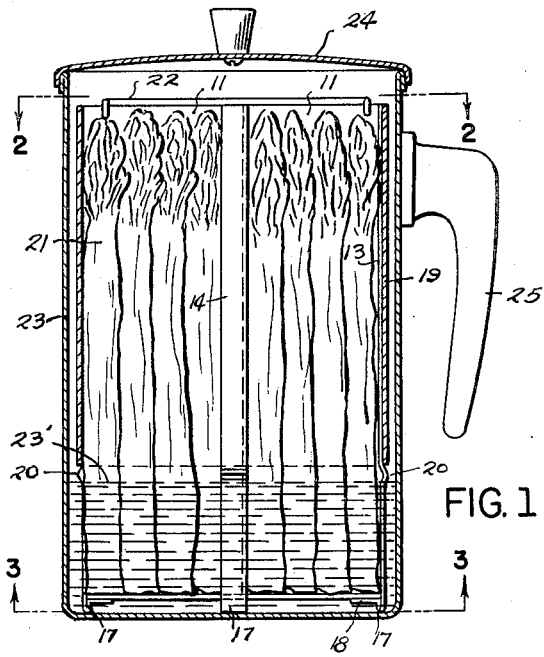
FIG. 1
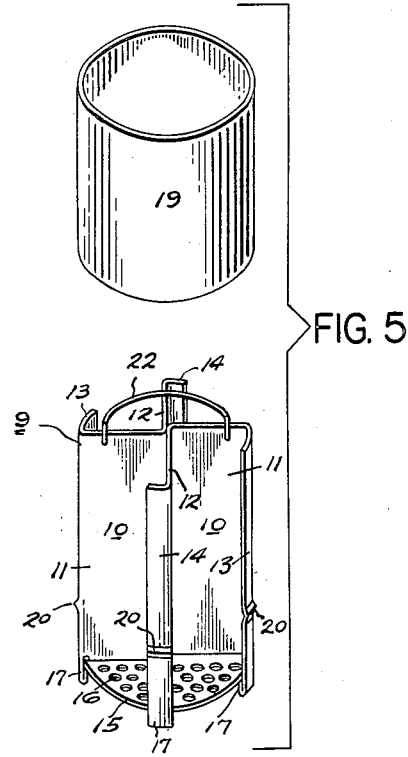
FIG. 5
FIG. 2
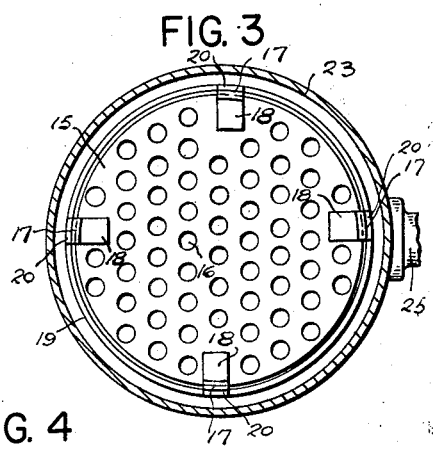
FIG. 3
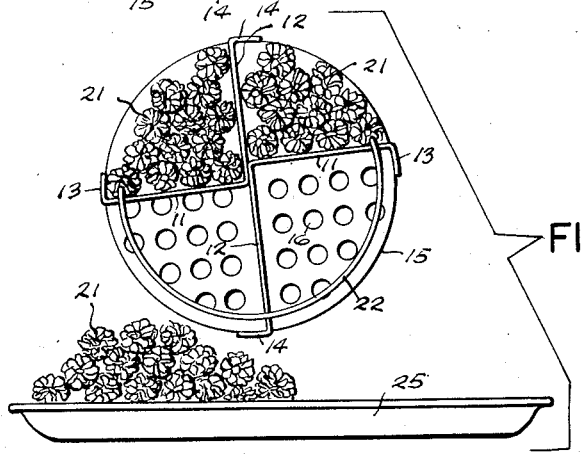
FIG. 4
INVENTOR.
HENRY WARD PETTY
BY
ATTORNEY

United States Patent Office 2,807,995
Patented Oct. 1, 1957

2,807,995

COOKING UTENSIL

Henry Ward Petty, Moorestown, N. J.

Application January 20, 1955, Serial No. 482,987

4 Claims. (Cl. 99—415)

This invention relates generally to cooking utensils and is concerned more particularly with an improved device for cooking asparagus and other foods.

A principal object of the present invention is to provide a device in which the cooking of asparagus stalks and tips may be effected in the same cooking time by boiling the heavy stalks and simultaneously steaming the tender tips.

Another object of the present invention is to provide a device for cooking asparagus, which device may be easily disassembled to facilitate transfer of the cooked asparagus to a serving dish, without injury to the asparagus.

Still other objects of the present invention are to provide such a device in which the asparagus is cooked standing on end, which facilitates draining off the water after the asparagus is cooked, and which can be used conjointly with any conventional container of suitable size having a lid.

Other objects and advantages of the present invention will appear more fully hereinafter, it being understood that said invention consists substantially in the combination, construction, location and general arrangement of parts, all as described in detail in the following specification, as shown in the accompanying drawing and as fully pointed out in the appended claims.

In the accompanying drawings:

Figure 1 is a vertical section showing the device embodying the present invention in use;

Figures 2 and 3 are horizontal sections taken respectively on lines 2—2 and 3—3 of Figure 1;

Figure 4 is an elevation illustrating transfer of the cooked asparagus from the device of the present invention to a serving dish; and Figure 5 is a perspective view wherein the device of the present invention is shown disassembled.

Referring to the drawings, and more particularly to Figures 4 and 5, it will be observed that the device of the present invention essentially comprises a central assembly or core, designated generally by the reference numeral 9, which includes a pair of plate members 10—10 each of which is divided by a longitudinally extending bend into a pair of right angularly related parts 11 and 12 the outer ends of which are respectively turned to provide marginal flanges 13 and 14. It will be noted that the marginal flanges 13 and 14 of the plate members 10—10 all present in the same direction and are all correspondingly curved to substantially the same radius so that upon securement together of the members 10—10 as shown, preferably by spot welding, the several flanges 13 and 14 are coincident with the line of a circle which circumscribes the longitudinally extending outer edges of the assembled plate members. While these members may be secured together otherwise than as shown, it is preferable to weld together overlapping portions of the parts 12—12, as at X, so as to provide at the center of the assembly a longitudinally extending rigid support for the outwardly extending marginally flanged parts 11 and 12. To this end, the transverse dimension of the part 12 of each plate member 10 is somewhat greater than that of the part 11. It will be understood, of course, that still other arrangements may be employed to provide a substantially similar assembly wherein a plurality of marginally flanged elements, similar to the parts 11 and 12, extend radially from a central support and that the number of such elements, and their annular spacing, may be varied as desired to provide the assembly with a different number of compartments than as shown.

Immediately underlying the several parts 11 and 12 is a plate member 15 which is provided with a plurality of perforations 16. For securing the plate member 15 against displacement, the several flanges 13 and 14 are extended downwardly beyond the plate member 15 to form legs designated 17, turned upwardly upon themselves, and then inwardly to form coplanar lips designated 18 underlying the plate member 15. The plate members 11, 12 and 15 are rigidly secured together by an suitable means, as by spot welding.

The device of the present invention also includes a cylindrical jacket 19 which fits freely over the core 9 so as to embrace the outwardly projecting marginally flanged parts 11—12 of the core assembly. The several flanges 13 and 14 are provided respectively with horizontally extending external beads 20 which are operative to limit the extent of axial movement of the jacket 19 relative to the central assembly or core 9.

In the use of the device of the present invention, the jacket 19 is slipped over the upper end of the core 9 and pushed downwardly until the lower end thereof engages the several beads 20. In this assembled condition, the upper end of the jacket 19 and that of the core 9 are disposed in substantially coplanar relation. The asparagus designated 21 is stacked in the four compartments of the device, with the tips of the asparagus presenting upwardly. The device loaded with asparagus is then lifted by means of a bail 22 and placed in a container 23 provided with a lid 24 and a handle 25, the bottom of the container 23 being first covered with water designated 23' to a depth sufficient for submerging the heaviest part of the asparagus stalks, say to the level of the several beads 20. The heavy asparagus stalks are thus cooked by boiling in water while the tender asparagus tips are simultaneously cooked by steaming, the stalks and tips being cooked in the same cooking time.

To serve the cooked asparagus, the device of the present invention is removed from the container 23 by first removing the lid 24 from the latter and then lifting the device loaded with cooked asparagus out of the water. After allowing a period of time sufficient for draining off excess water, the device is turned on its side over a serving dish 25 and positioned as shown in Figure 4. Then the device is disassembled by removing jacket 19 from the core 9, whereupon the asparagus in the lower compartments drops into the serving dish. Still referring particularly to Figure 4, the asparagus in the upper left hand compartment is retained by a lip 13, while the asparagus in the upper right hand compartment is retained by the part 11 of one plate member 10 and the part 12 of the plate member 10, which parts are inclined to favor retention, as shown. In order to transfer the asparagus in the upper compartments to the serving dish 25, the core 9 is moved over the serving dish 25 and simultaneously turned, preferably in clockwise direction about its principal axis, whereupon the upper compartments successively unload as they exchange positions with the lower compartments.

When both the heavy stalks and the tender tips of asparagus are cooked by means of the same medium, i. e., boiled or steamed, it is likely that either the tips will be overcooked or the stalks will be undercooked. More likely the stalks will be undercooked, in consequence of which they must be discarded. Since the present device affords means for boiling the stalks and simultaneously steaming the tips, and since the cooking time for boiling the stalks is the same as that for steaming the tips, it should be obvious that the device of the present invention provides means for reducing to a minimum the number of stalks that have to be discarded because undercooked.

The device of the present invention is of such size and shape that it may be used conjointly with any conventional container of suitable size having a lid, for example, a coffee pot, in consequence of which it can be sold with or without a container 23 specifically designed for use therewith.

It should be noted that when the device is turned on its side, the cooked asparagus is supported along its full length, and that it remains supported thus until it actually drops into the serving dish 25, in consequence of which injury to the tender asparagus tips is reduced to a minimum.

It will be understood, of course, that the present invention is susceptible of various changes and modifications which may be made from time to time without involving any departure from the general principles or real spirit thereof. Accordingly, it is intended to claim the same broadly, as well as specifically, as indicated in the appended claims.

What is claimed as new and useful is:

1. In a cooking utensil of the character described a cylindrical core having a plurality of longitudinally extending partitions of sheet material diverging outwardly from the center of the core and thereby forming a longitudinally extending compartment between each successive pair of partitions, the longitudinally extending inner marginal portions of said partitions being rigidly secured together and the longitudinally extending outer marginal portions of said partitions being circumferentially turned all in the same direction, each successive pair of said outer marginal portions defining therebetween a longitudinally extending opening in the side of said core, and a sheet material member rigidly secured to said partitions and extending transversely across the lower end portion of said core and thereby forming a bottom for said compartments, said compartment bottom being located above the lower extremity of said core, a cylindrical sheet material jacket removably fitted over said outer marginal portions of the partitions and extending axially from the top of said core downwardly toward the bottom thereof, the lower extremity of said jacket being disposed a substantial distance above said compartment bottom, and a container for removably receiving said core jacketed in the manner aforesaid, said core and jacket assembly being supported on the bottom of said container with said compartment bottom elevated thereabove.

2. In a cooking utensil as defined in claim 1 wherein the partitions are flat and the longitudinally extending outer marginal portions thereof circumferentially turned all in the same direction are flanges extending axially downwardly below the compartment bottom to the container bottom to thereby support said compartment bottom a substantial distance above said container bottom.

3. In a cooking utensil as defined in claim 1 wherein the partitions are flat and the longitudinally extending outer marginal portions thereof circumferentially turned all in the same direction are flanges of arcuate shape in transverse section and extending axially downwardly below the compartment bottom to the container bottom, the lower extremities of said flanges are turned inwardly and upwardly upon themselves, and the compartment bottom is fitted between said flanges and seated upon said turned up flange portions, being supported by the latter a substantial distance above said container bottom.

4. In a cooking utensil as defined in claim 1 wherein the partitions are flat and the longitudinally extending outer marginal portions thereof circumferentially turned all in the same direction are flanges extending axially downwardly below the compartment bottom to the container bottom to thereby support said compartment bottom a substantial distance above said container bottom, said compartment bottom is perforated, and the sides of the core are open between each adjoining pair of said flanges both below and immediately above said compartment bottom for circulation of water in said container freely at the bottom of said core.

References Cited in the file of this patent

UNITED STATES PATENTS

| 1,750,258 | Brown | Mar. 11, 1930 |
| 1,909,983 | Powell | May 23, 1933 |

FOREIGN PATENTS

| 345,410 | France | Oct. 13, 1904 |